(12) United States Patent
Lindberg

(10) Patent No.: US 9,481,285 B2
(45) Date of Patent: Nov. 1, 2016

(54) STRAP ASSEMBLY AND PROTECTIVE COVER FOR A HOOK OF A STRAP ASSEMBLY

(71) Applicant: Samuel Lindberg, Holland, MI (US)

(72) Inventor: Samuel Lindberg, Holland, MI (US)

(*) Notice: Subject to any disclaimer, the term of this patent is extended or adjusted under 35 U.S.C. 154(b) by 175 days.

(21) Appl. No.: 14/103,926

(22) Filed: Dec. 12, 2013

(65) Prior Publication Data

US 2015/0013116 A1   Jan. 15, 2015

Related U.S. Application Data

(60) Provisional application No. 61/845,802, filed on Jul. 12, 2013.

(51) Int. Cl.
*A44B 13/00* (2006.01)
*B60P 7/08* (2006.01)

(52) U.S. Cl.
CPC ........... *B60P 7/0869* (2013.01); *Y10T 24/4755* (2015.01)

(58) Field of Classification Search
CPC ... B60P 7/0869; B60P 7/0823; B60P 7/0807; Y10T 24/4755; Y10T 24/314; Y10T 24/3484; F16B 45/00; B65D 71/04; Y10S 24/907; Y10S 24/31; Y10S 24/316; Y10S 24/318
USPC ....................... 24/265 H; 410/41, 97, 99, 116
See application file for complete search history.

(56) References Cited

U.S. PATENT DOCUMENTS

| | | | |
|---|---|---|---|
| 2,989,191 A | 3/1960 | Eason | |
| 4,730,723 A * | 3/1988 | Mossot | B65G 39/04 198/827 |
| 5,416,956 A | 5/1995 | Rubin | |
| 5,553,981 A | 9/1996 | Braden | |
| D383,910 S | 9/1997 | Maxwell | |
| 5,848,743 A | 12/1998 | Derecktor | |
| 6,209,174 B1 * | 4/2001 | Selby | B41F 27/1262 101/415.1 |
| 6,618,912 B1 | 9/2003 | Chang | |
| 7,181,809 B1 * | 2/2007 | Kuo | F16B 2/005 24/265 H |
| 8,387,217 B1 * | 3/2013 | Hinds | A63B 21/00065 24/134 R |
| 8,915,685 B2 * | 12/2014 | Flores | B25F 1/00 410/99 |
| 2009/0100646 A1 * | 4/2009 | Wang | F16B 45/00 24/265 H |
| 2009/0245963 A1 * | 10/2009 | Schoor | B60R 7/043 410/97 |

* cited by examiner

*Primary Examiner* — Robert J Sandy
*Assistant Examiner* — Matthew Sullivan
(74) *Attorney, Agent, or Firm* — The Watson I.P. Group, PLC; Jovan N. Jovanovic; Vladao M. Vasiljevic

(57) ABSTRACT

A protective hook cover configured for use in association with a hook member having a base and a leg joined together about a bend region so as to define a retention channel therebetween. The protective hook cover comprises a base region cover portion, a leg region cover portion and a connecting cover portion therebetween. The connecting cover portion including a plurality of nub bumper members extending outwardly from the outer base surface. A combination protective hook cover and hook member is also disclosed, as is the inclusion of a strap member.

18 Claims, 7 Drawing Sheets

STRAP ASSEMBLY AND PROTECTIVE COVER FOR A HOOK OF A STRAP ASSEMBLY

CROSS-REFERENCE TO RELATED APPLICATION

This application claims priority from U.S. Provisional Pat. App. Ser. No. 61/845,802, entitled Rubber Guard That Slips Over 2", 3", or 4" Steel Tie-Down Hooks That Are Attached To Nylon Straps For Securing Loads On Flatbed Trucks, filed Jul. 12, 2013, the entire specification of which is incorporated by reference in its entirety.

BACKGROUND OF THE DISCLOSURE

1. Field of the Disclosure

The invention relates in general to straps, cables and tie-downs typically utilized with the retaining of different items such as equipment, cargo and the like, and more particularly, to a strap assembly and protective cover for a hook of a strap assembly. It will be understood that the particular use of the strap assembly that is shown is for illustrative purposes and not to be deemed limiting.

2. Background Art

The use of straps and the like for retaining any number of different materials, items, boxes, cargo, equipment and the like are known in the art. In many instances, the straps may comprise elastic members having a hook at the end thereof. In other embodiments, the straps comprise woven straps that have hooks an end thereof, with the other end free to be incorporated into a ratcheting member or the like.

Such straps are often used to retain large objects during storage and shipping. The installation procedure is to typically grab two straps, then affix the hook of each strap to desired, often opposing locations. The straps are then fed into a ratcheting member and the ratcheting member is manipulated so as to tighten the straps until they are tight and there is very little to no remaining slack.

Problematically, the hook members generally comprise a metal member that when thrown around the worksite. At best, the hook members may include a coating of a rubberized or other flexible material. More often, there is no coating, or a compromised or worn coating. The coating generally protects a surface from scratching and marring, but is too thin to provide any genuine protection to equipment or other objects. Moreover, the coating does little to protect persons and workers that are inadvertently hit by such a hook.

Thus, it would be an advantage to provide a strap assembly having a hook member that includes a protective hook cover.

It is another object of the disclosure to provide a hook member that minimizes the possibility of injury to users as well as damage to outside structures and objects.

It is another object of the disclosure to provide a protective hook cover that can be retrofitted onto existing hook members to provide increased safety and utility therefore.

SUMMARY OF THE DISCLOSURE

The disclosure is directed to a protective hook cover configured for use in association with a hook member having a base and a leg joined together about a bend region so as to define a retention channel. The protective hook cover comprises a base region cover portion, a leg region cover portion and a connecting cover portion. The base region cover portion is extendable over a base of a hook member. The base region cover portion includes an outer portion and an inner portion, a first side portion and a second side portion opposite the first side portion. The outer portion, inner portion, first and second side portions defining an outward opening at an end thereof. The leg region cover portion is extendable over a leg of a hook member. The leg region cover portion includes an outer portion, an inner portion, a cap portion, a first side portion and a second side portion. The cap portion covers a second end edge of a leg of a hook member. The outer portion, the inner portion, the cap portion, the first and second side portions define a cavity for receipt of at least a portion of a leg of a hook member. The connecting cover portion extends between the base region cover portion and the leg region cover portion. The connecting cover portion includes an outer base surface coupling the outer portion of the base region cover portion with the outer portion of the leg region cover portion. A first side surface couples the first side portion of the base region cover portion with the first side portion of the leg region cover portion. A second side surface couples the second side portion of the base region cover portion with the second side portion of the leg region cover portion. A plurality of nub bumper members extend outwardly from the outer base surface.

In a preferred embodiment, the plurality of nub bumper member comprise a first end nub member positioned proximate the first side surface of the connecting cover portion and a second end nub member positioned proximate the second side surface of the connecting cover portion. At least one central nub member is positioned therebetween.

In another preferred embodiment, the first end nub member includes a first surface which is inclined outwardly toward the first side surface from an outer surface of the first end nub toward the outer base surface. The second end nub member includes a first surface which is inclined outwardly toward the second side surface from an outer surface of the second end nub toward the outer base surface.

In another preferred embodiment, the at least one central nub member comprises a plurality of central nub members spaced apart from each other extending from the outer base surface and extending between the first end nub member and the second nub member.

In another preferred embodiment, each of the central nub members are substantially identical. Each includes a first side and a second side with an outer surface spanning therebetween. The first and second sides are substantially parallel to each other.

In another preferred embodiment, each of the central nub members are substantially parallel to each other.

In yet another preferred embodiment, the plurality of nub members comprise one of the group selected by cylindrical nub members, cylindrical nub members with a concave upper surface, hemispherical nub members, and nub members that extend from side to side along the base outer surface.

In another preferred embodiment, the first and second nub bumper members and the at least one central nub member each have a substantially semicircular outer surface corresponding to a bend region of the hook member.

Preferably, the base region cover portion and the leg region cover portion are angled relative to each other when in an unstressed orientation.

In another preferred embodiment, the base region cover portion and the leg region cover portion are angled relative to each other at an angle that is greater than an angle between a base and a leg of a hook member. Thus, the shape of the protective hook cover in an installed orientation is different than the shape of the protective hook cover in an unstressed orientation.

In some such embodiments, the outer surface of the nub bumper members are stretched when in an installed orientation.

In another preferred embodiment, the inner portion of the base region cover portion includes an inward edge. The inner portion of the leg region cover portion includes an inward edge. The inward edge of the inner portion of the base region cover portion and the inward edge of the inner portion of the leg region cover portion are spaced apart from each other.

In another preferred embodiment, the inward edge of the inner portion of the base region cover portion and the inward edge of the inner portion of the leg region cover portion are on opposing sides of a retention channel in the installed orientation.

Preferably, the protective hook cover is formed from a polymer material. In some embodiments, the polymer material comprises a thermoplastic elastomer.

In another aspect of the disclosure, the disclosure is directed to a combination hook member and protective hook cover. The hook member includes a base hook member having a base and a leg joined together about a bend region so as to define a retention channel. The protective hook cover includes the features identified supra.

BRIEF DESCRIPTION OF THE DRAWINGS

The disclosure will now be described with reference to the drawings wherein.

DETAILED DESCRIPTION OF THE DISCLOSURE

Figure 1:
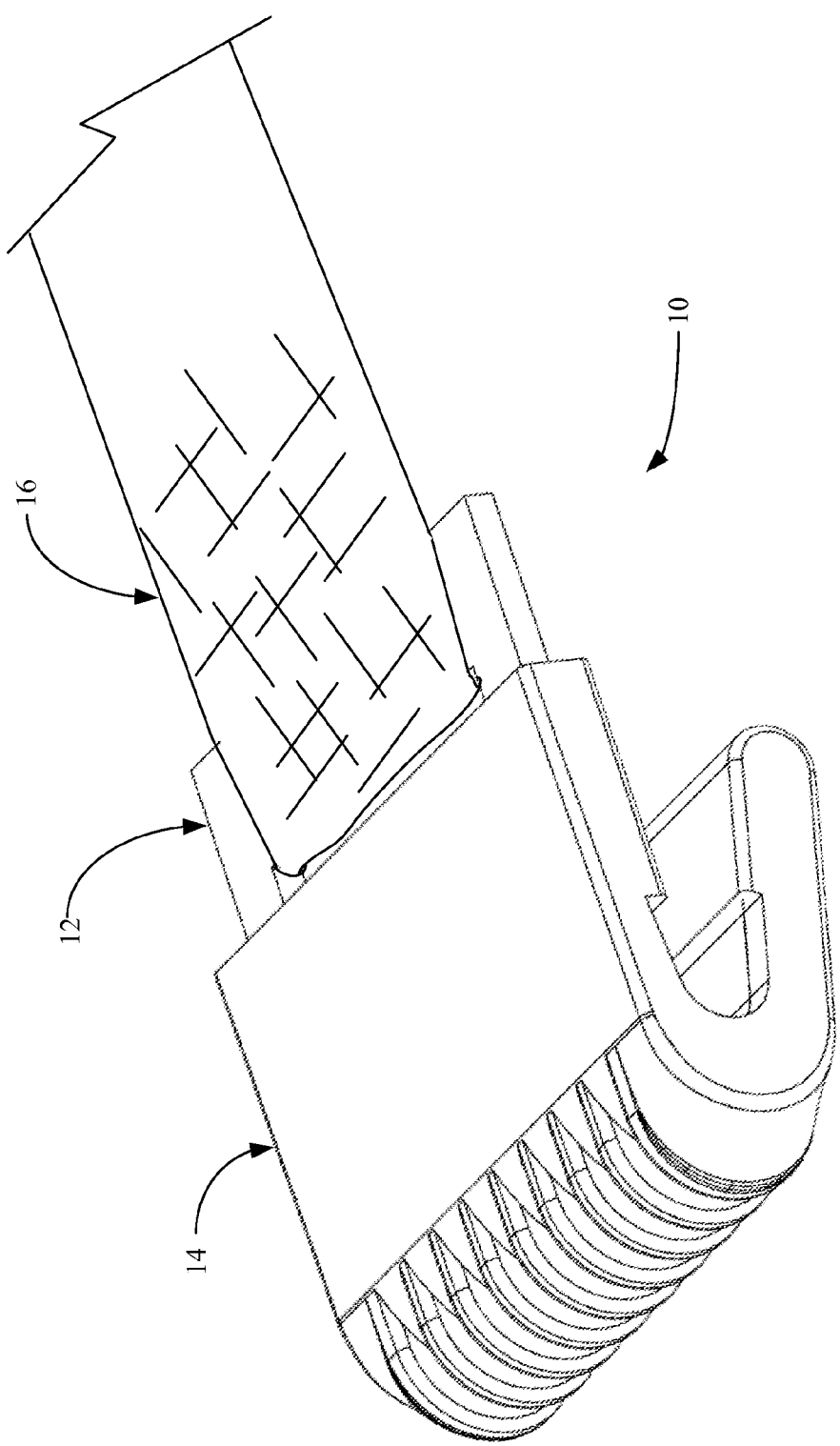
FIG. 1 of the drawings is a perspective view of a strap assembly of the present disclosure.

While this invention is susceptible of embodiment in many different forms, there is shown in the drawings and described herein in detail a specific embodiment with the understanding that the present disclosure is to be considered as an exemplification and is not intended to be limited to the embodiment illustrated It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 2:
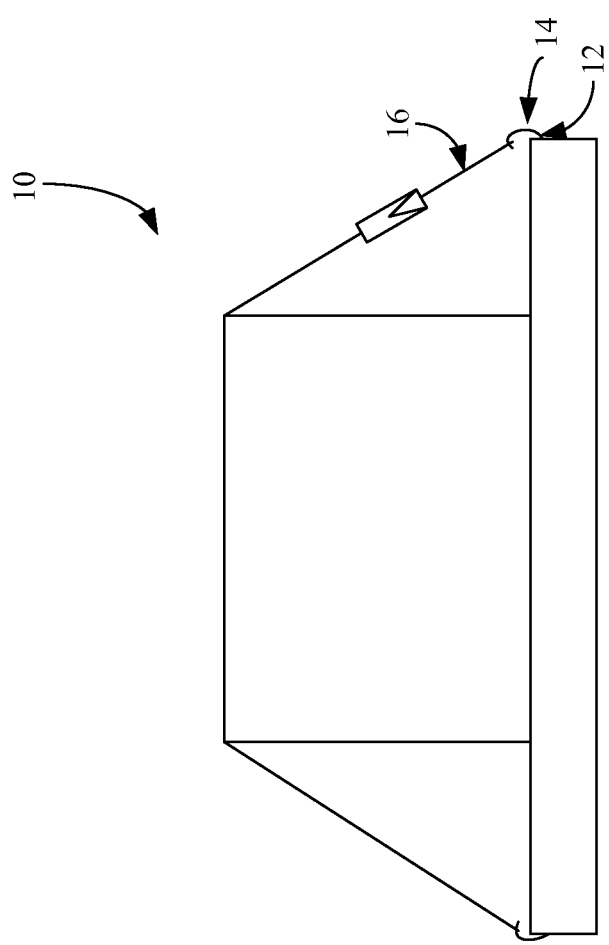
FIG. 2 of the drawings is a schematic representation of the strap assembly of the present disclosure, in an exemplary position, retaining a box on a platform.
Figure 4:
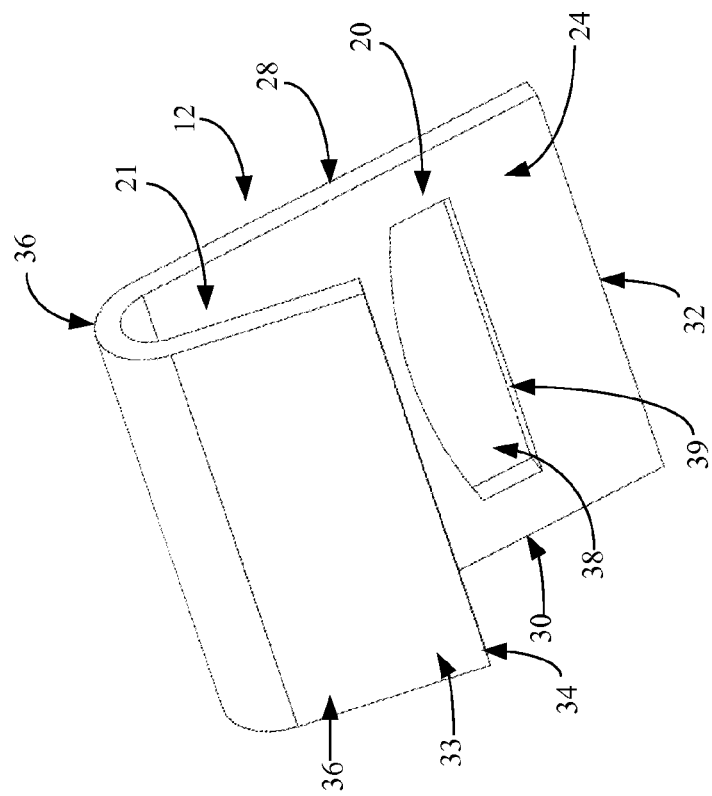
FIG. 4 of the drawings is a perspective view of the hook member of the present disclosure.

Referring now to the drawings and in particular to FIG. 1, the strap assembly is shown generally at 10. The strap assembly includes hook member 12, protective hook cover 14 and strap 16. It will be understood that the strap assembly may be used in association with any number of differently configured strap systems. For example, as is shown in FIG. 2, the strap assembly of the present disclosure may be utilized with straps such as ratchet straps that are often utilized in a number of different cargo applications. It will be understood that the strap assembly may be utilized with other types of strapping and for applications different than cargo applications. The foregoing examples were meant for illustrative purposes and are not deemed to be limiting.

With reference to FIGS. 3 through 6, hook member 12 includes base 20 and leg 22 which are joined together by bend region 36. These components generally define a retention channel 21. Generally the base and the leg are angled relative to each other and are generally planar members that are bent about a predetermined radius. In the embodiment shown, the base 20 and the leg 22 defines an included angle preferably ranging between 5° and 60°, and more preferably between 10° and 20°. The included angle can be varied without departing from the scope of the disclosure. Generally, the leg 22 is shorter than the base 20 such that a portion of the base 20 is outside of the retention channel 21.

The hook member 12 generally comprises a single monolithic member (although multiple members that are welded together or riveted together are likewise contemplated). Most often, the hook member comprises a flat stock of metal that has been bent at the bend region to form the base and the leg. Generally, the hook member comprises a metal member, such as, for example, steel. Other embodiments may contemplate the use of different metals and alloys thereof, such as, for example, aluminum or the like. In certain embodiments, composites may be utilized.

The hook member 12 includes inner surface 24 and outer surface 26 which include first side edge 28 and second side edge 30. The hook member extends from first end edge 32 to second end edge 34. A band opening 38 is provided proximate the first end edge 32 preferably spaced apart from the retention channel 21 so as to maintain a strap away from the retention channel and wear from contact with outside surfaces. The band opening includes an inner edge 39 about which the strap is bent over. In the embodiment shown, the hook member is generally symmetrical between the first side edge 28 and the second side edge 30 about an axis bisecting the same extending therebetween.

Figure 3:
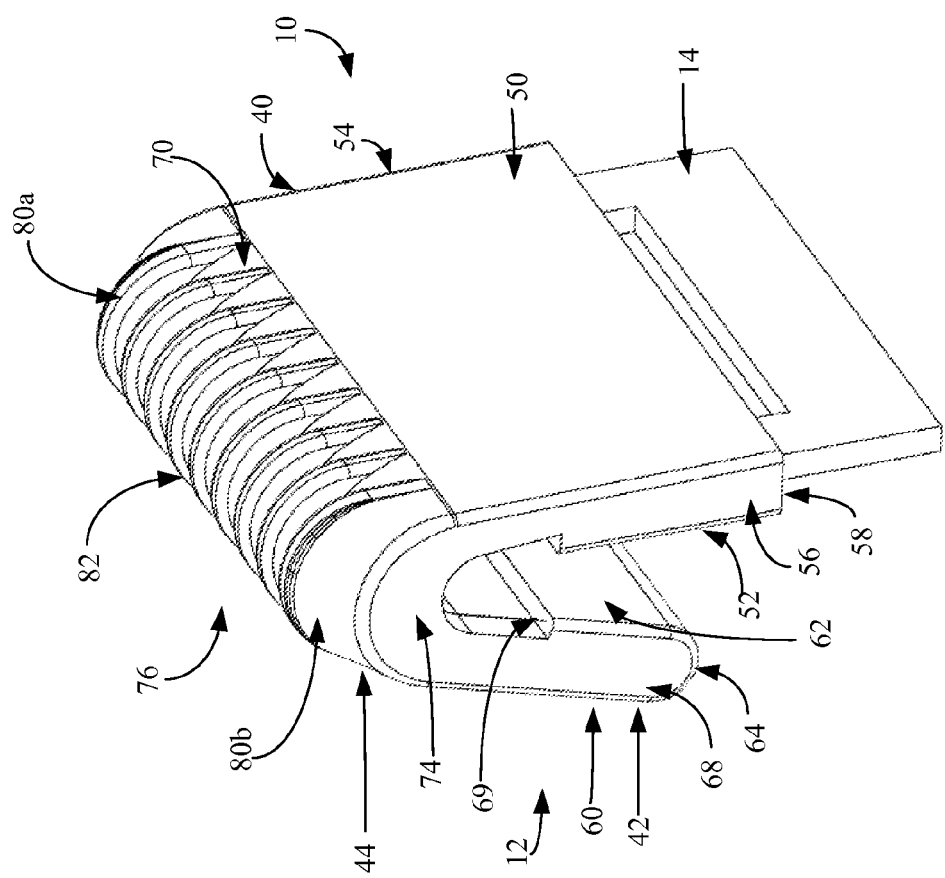
FIG. 3 of the drawings is a perspective view of the hook member having a protective hook cover of the present disclosure.
Figure 6:
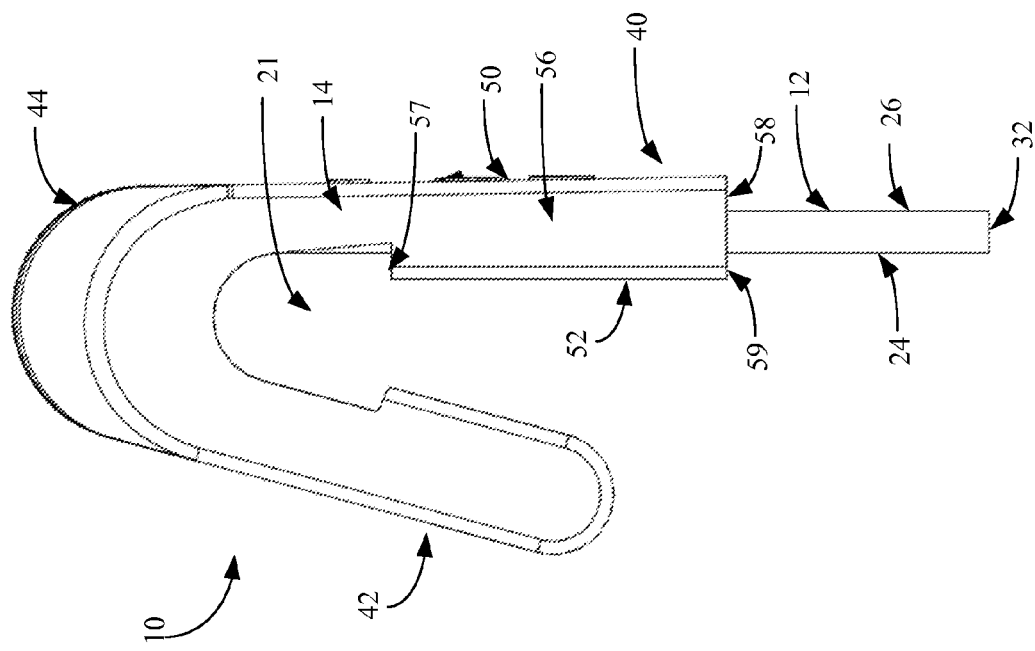
FIG. 6 of the drawings is a side elevational view of the hook member having the protective hook cover of the present disclosure.
Figure 5:
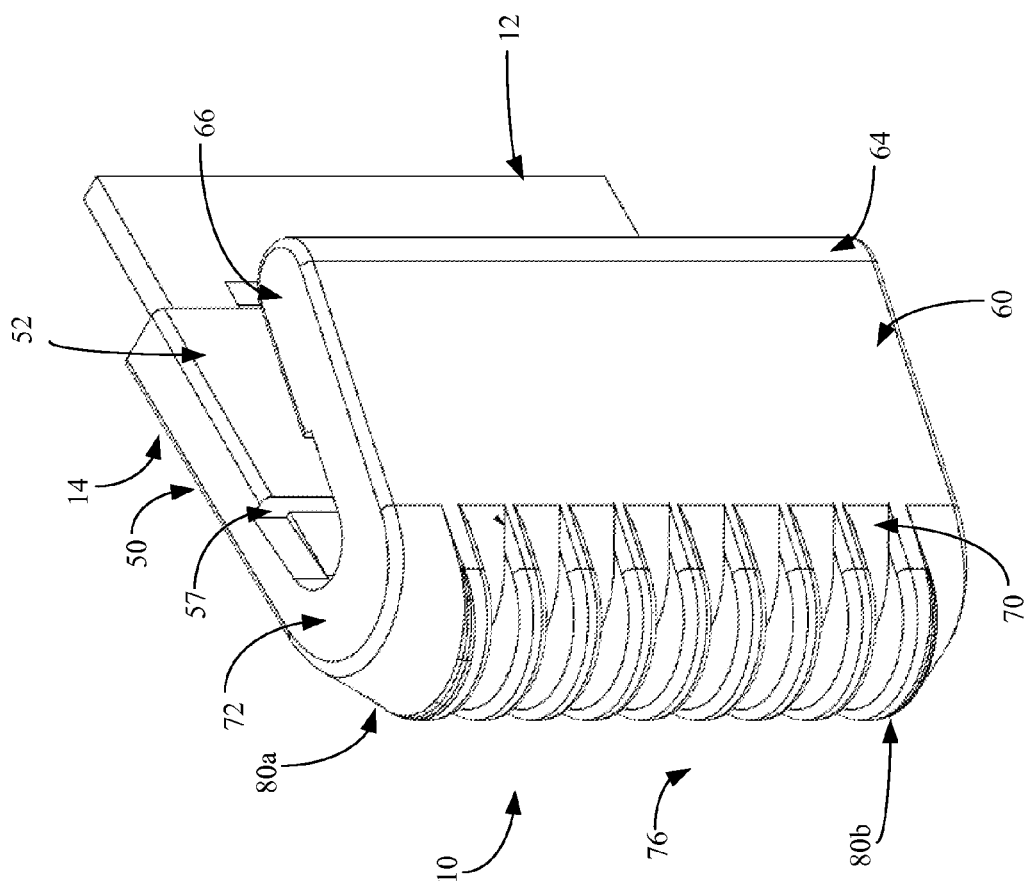
FIG. 5 of the drawings is a perspective view of the hook member having a protective hook cover of the present disclosure.

The protective hook cover 14 is shown in FIGS. 3, 5 and 6 as comprising a molded polymeric member (typically injection molded) which includes outer surface 45, inner and surface 46. The outer surface 45 is exposed to outside structures, whereas the inner surface 46 generally abuts the surfaces of the hook member 12. The inner surfaces define slot 47 and the cavity 48 of the protective hook cover. While a number of different polymers are contemplated such as, for example polyurethanes, styrenes, polypropylenes, thermoplastic elastomers and the like. One particularly suitable material comprises a thermoplastic elastomer which is based on a styrene-Ethylene/Butylene-Styrene Block Copolymer (SEBS). One such polymer is available from United Soft Plastics, Inc. of Lawrenceville, Ga. and sold under the trade name Unisoft Standard (and among these, ST-20A-NT-1-01/U, or ST-30A-NT-1-01-U) or Unisoft TPE ST-01A-NT-1-01. Of course, a number of other materials are contemplated for use, and the foregoing is provided for illustrative purposes, and not to be limiting.

The protective hook cover 14 includes base region cover portion 40, leg region cover portion 42 and bend region cover portion 44. The base region cover portion 40 extends over the base 20 of the hook member 12, and includes outer portion 50, inner portion 52, first side portion 54 and second side portion 56. The portions define the outward opening 58 and the outward edge perimeter 59. The outward edge perimeter 59 generally extends outside of the retention channel and generally stopping short of the band opening 38.

The inner portion further includes inward edge 57 opposite the outward opening. Thus, the inner portion generally comprises a strip extending across from the first side portion to the second side portion. In the embodiment shown, the inward edge 57 extends into the retention channel 21, stopping a distance apart from the bend region 36. It is preferred that the inward edge 57 is spaced apart from the bend region 36 of the retention channel. Furthermore, as will be explained with respect to the method, it is desirable to insure that the width of the inner portion is such (when combined with the material properties) to easily be slipped over the hook member and into the desired orientation. Of course other configurations are likewise contemplated.

The leg region cover portion opposes 42 includes outer portion 60, inner portion 62, cap portion 64 first side portion 66 and second side portion 68. The leg region cover portion covers the leg 22 including the distal portion thereof (at the second end edge 34). The inner portion 62 includes inward edge 69 that is spaced apart from the cap portion and extends into the retention channel 21. As with the inward edge 57, the inward edge 69 of the inner portion of the leg region cover portion is spaced apart from the bend region 36 of the hook member. In the embodiment shown, the inward edge 57 and the inward edge 69 generally correspond to each other and are generally oppose each other.

In the embodiment shown, the cap portion 64 generally comprises a semicircular cross-sectional configuration which is centered. Of course, other variations are contemplated, such as, for example, a squared cross-sectional configuration, asymmetrical cross-sectional configuration or an triangularly shaped cross-sectional configuration.

The connecting cover portion 44 comprises outer base surface 70 with first side surface 72 and second side surface 74. The base surface 70 spans between the outer portion 50 of the base region cover portion and outer portion 60 of the leg region cover portion 42. The first side surface 72 spans between the first side portion 54 of the base region cover portion and the first side portion 66 of the leg region cover portion. Similarly, the second side surface 74 spans between the second side portion 56 of the base region cover portion and the second side portion 68 of the leg region cover portion 42. The side portions generally cover the side edge edges 28, 30 of the hook member 12. In the embodiment shown, a portion of the hook proximate the inward edge 57 is uncovered, while the remainder of the side edges of the hook member are covered thereby.

Figure 8:
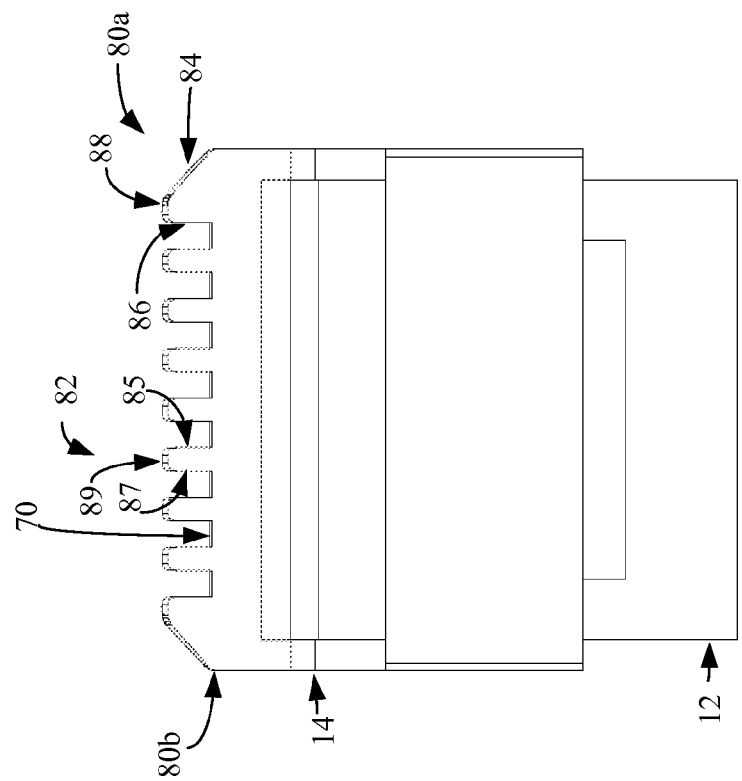
FIG. 8 of the drawings is a cross-sectional view of the hook member having the protective hook cover of the present disclosure, showing, in particular, the configuration of the nub bumper members.
Figure 7:
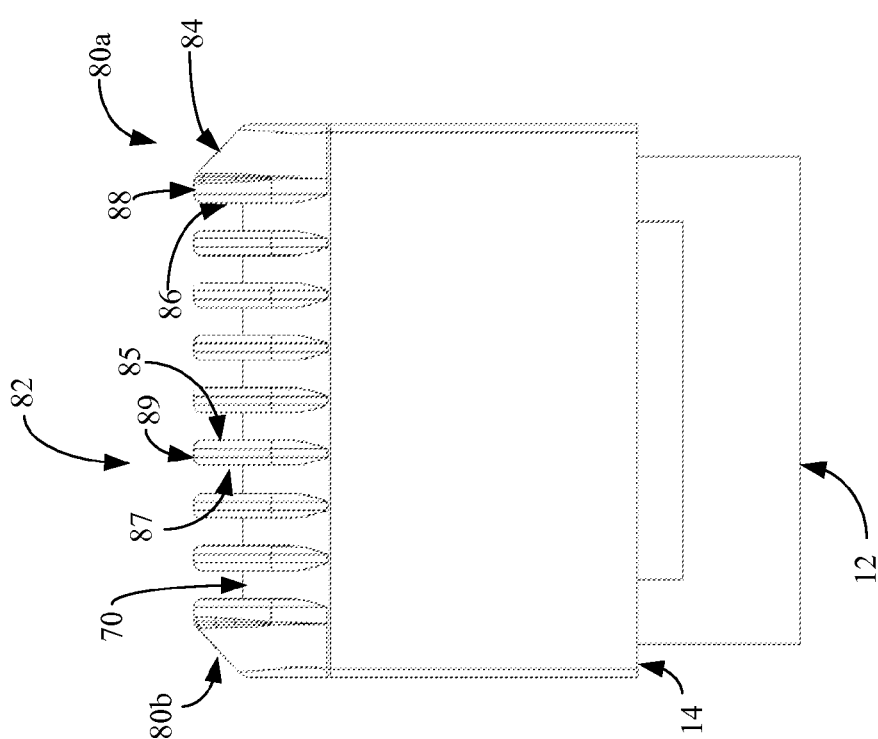
FIG. 7 of the drawings is a top plan view of the hook member having the protective hook cover of the present disclosure.

With further additional reference to FIGS. 7 and 8, a plurality of nub bumper members 76 extend outwardly from the outer base surface 70 generally perpendicularly to the surface thereof. The nub bumper members include end nub members 80a, and 80b and central nub members, such as central nub member 82. The end nub member 80a will be described with the understanding that the end nub member 80b is substantially identical thereto. The end nub member includes first side 84, second side 86 and outer surface 88. The first side is generally substantially planar whereas the second side 86 is outwardly tapered so as to be outwardly angled from the outer surface of the nub to the first side surface of the connecting cover portion. The second side is generally perpendicular to the outer base surface 70. Generally, the tapered portion is at least twice the width of the nub member width (of, for example, central nub member 82. In the embodiment shown, the end nub member generally has a configuration of a central nub member with a taper extending from one side thereof toward the side edge. The hub member has a arcuate configuration, which, in the embodiment shown is semi-circular in configuration.

The central nub member 82 will be described with the understanding that the remaining central nub members are substantially identical. The central nub member 82 includes first side 85, second side 87 and outer surface 89. The outer surface generally comprises a arcuate surface (which may be semi-circular) that mimics the bend region (although the shapes may be different), with a thickness such that the central nub member can pivot from side to side and also absorb due to the material configuration. The central nub members are spaced apart so as to permit movement and so as to provide a thickness of the central nub members to effectuate dampening and pivoting actions. The central nub members are generally evenly spaced apart and generally uniformly perpendicular to the outer base surface.

It will be understood that other configurations are contemplated, such as differently configured outer surfaces, different thicknesses, and different first and second side configurations. In other embodiments, a greater or fewer number of central nub members can be employed, depending on the circumstances, as well as nub members that are disposed in an orientation other than perpendicular to the outer base surface.

In other embodiments, the nub members may comprise bumps (such as, for example, hemispherical members which extend from the outer base surface 70. These hemispherical members may be positioned randomly or in a particular pattern along the outer base surface. In addition, the hemispherical members may be uniform, or may be differently sized and of a different height away from the outer base surface. In other embodiments, the nubs may comprise a concave upper end so as to be cylindrical members having an upper surface that is hemispherically concave. In still other embodiments, the nub members may comprise members that extend between the first side and the second side (i.e., perpendicular to the nubs shown in the Figures). Of course, other variations are likewise contemplated, and the disclosure is not limited to these particular structures. Some differently configured nub members are shown in FIG. 11(*a*) through 11(*d*).

Advantageously, the protective hook cover may be formed in a mold in a configuration wherein the protective hook cover may be of a configuration other than the hook member. For example, and with reference to FIGS. 9 and 10, the protective hook cover is molded so that the angle between the base region cover portion and the leg region cover portion is about perpendicular. Of course, other configurations are likewise contemplated for use. The protective hook member is then introduced to the formed hook member and slid over the outer surface thereof into the desired position. Such a configuration and formation allows for the protective hook cover to be used as a retrofit item to fit over conventional hook members that do not have an outer protective cover, coating, or one that is failing or otherwise unsatisfactory. It will be understood that the protective hook cover may be provided in a number of different sizes so as to be capable of fitting over a number of known protective hooks.

Generally, the strap member 16 comprises a woven material strap or belt that is extended through the band opening 38 and folded over itself. The strap member can then be stitched to itself forming a loop with the inner edge captured thereby. Any number of different straps are contemplated for use, and the disclosure is not limited to any particular strap configuration, strap size or strap material. Typically, the material is a woven polymeric fabric.

Figure 10:
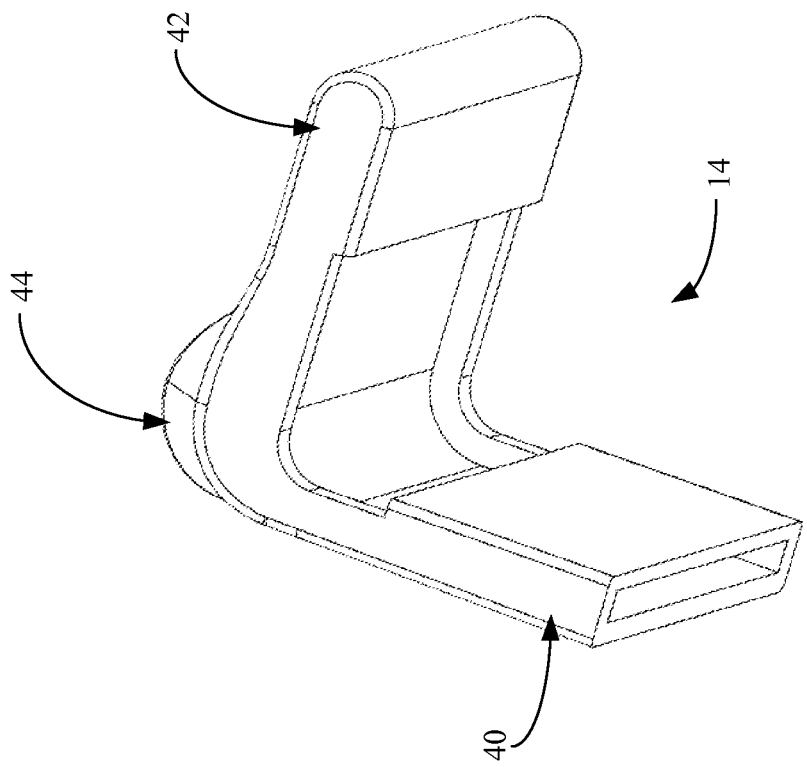
FIG. 10 of the drawings is a perspective view of the protective hook cover of the present disclosure in an unstressed orientation prior to positioning onto a hook member, or after removal from a hook member, showing, in particular, the inner portions of the cover, showing the inside portions, as well as the cavity and slot formed thereby.
Figure 9:
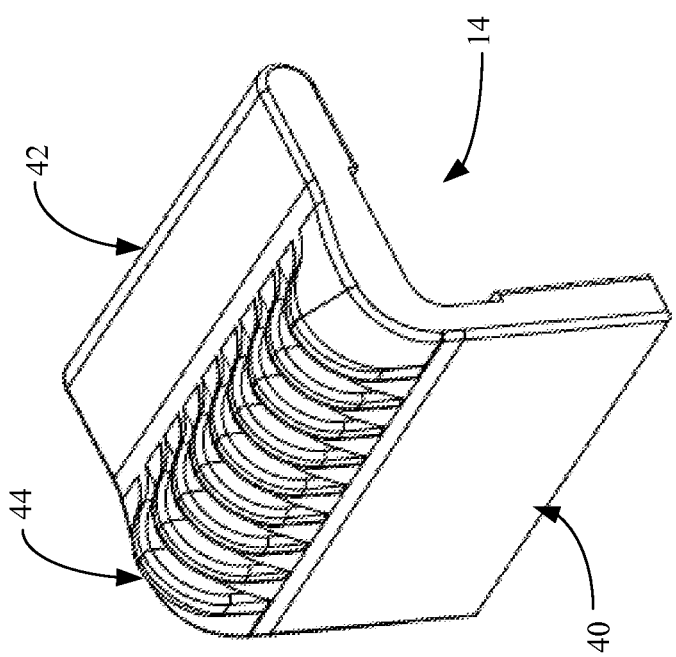
FIG. 9 of the drawings is a perspective view of the protective hook cover of the present disclosure in an unstressed orientation prior to positioning onto a hook member, or after removal from a hook member, showing, in particular, the outer surface of the protective hook cover.
Figure 11B:
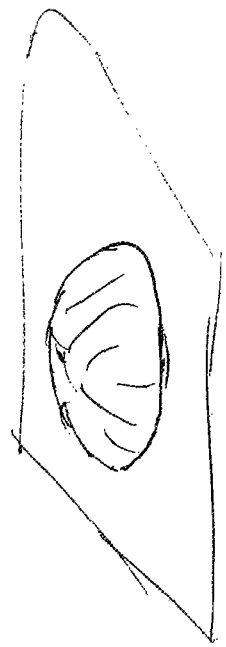
FIGS. 11(*a*) through 11(*d*) comprise a number of different nub members that are contemplated for use in the present disclosure.
Figure 11D:
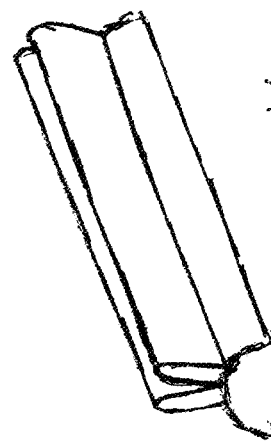
Figure 11A:
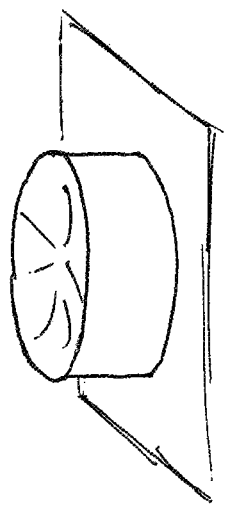
Figure 11C:
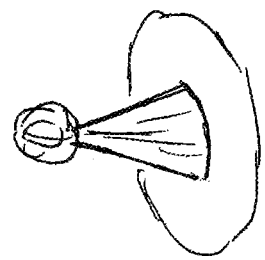

In operation, the users may be, for example, supplied with a conventional hook member of the type shown in the Figures, without a protective hook cover. Once provided, the user can select a protective hook cover that is of suitable size to be fitted over the selected hook member. Once selected, it may be advantageous to apply a lubricant to the hook member to assist with the sliding of the protective hook cover over the hook member. In other embodiments, the natural lubricity of the protective hook cover member may be sufficient to enable sliding with relative ease. It is desirable that the cavity defined by the protective hook cover in at least some region or regions is dimensioned so as to be slightly biased (or stretched) when positioned over the hook member. For example, when the protective hook cover of FIGS. 9 and 10 is slid over the hook member of FIG. 3, the outer surfaces (among other surfaces, such as the first and second side portions of at least the connecting cover portion) of the nub members are stretched. This biasing or stretching may aid in the retention of the protective hook cover in the desired orientation.

To place the protective hook cover over the hook member, the user first introduces the second end edge 34 to the outward opening 58 of the base region cover portion 40. The protective hook cover is then urged along the leg 22 and toward and into the bend region. Continued urging directs the protective hook cover over the base 20, typically until the cap portion interfaces with the second end edge of the hook member which precludes further insertive movement. Once the cap portion engagement is achieved, the cover portion generally is in position around the bend region, with the nub bumper members extending radially outward from the outer surface of the bend region. In such a configuration, the bend region tends to be free of a protective hook cover, that is, the inward edge 57 of the inner portion 52 of the base region cover portion is spaced apart from the inward edge 69 of the inner portion 62 of the leg region cover member 42). This allows direct engagement of the metal of the hook, whereas, the protective hook cover extends on either side of the retention channel and into the retention channel. The inner portion of the base region cover portion is opposite the inner portion of the leg region cover portion, as the two oppose each other. The hook is now ready for use.

The protective hook cover provides for energy dissipation where the nub bumper member inadvertently contact or impact another object. Where the object is a piece of equipment, cargo, or the like, damage is minimized. Where the object is a person, injury to the person is minimized.

It will be understood that it is desirable that the protective hook cover last the lifetime of the strap assembly. It will be understood, however, that from time to dime, the protective hook cover may become damaged or otherwise compromised. In such a condition, the user can cut the protective hook cover from the hook member and either use the hook without a hook cover, or introduce another hook cover.

It will be understood that in other embodiments, the protective hook cover of the present disclosure may be molded over the hook member in a molding operation. And, that the disclosure is not limited to a protective hook cover that is slidably coupled to the hook member, although, such a configuration has certain advantages over other manufacturing methods.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A protective hook cover slidably positionable over a hook member having a base and a leg joined together about a bend region so as to define a retention channel therebetween, the protective hook cover comprising:
   a base region cover portion extendable over a base of a hook member, the base region cover portion including an outer portion and an inner portion, a first side portion and a second side portion opposite the first side portion, the outer portion, inner portion, first and second side portions defining an outward opening at an end thereof, and the inner portion defining an inward edge;
   a leg region cover portion extendable over a leg of a hook member, the leg region cover portion including an outer portion, an inner portion, a cap portion, a first side portion and a second side portion, the cap portion covering a second end edge of a leg of a hook member, with the outer portion, the inner portion, the cap portion, the first and second side portions defining a cavity for receipt of at least a portion of a leg of a hook member, the inner portion defining an inward edge; and
   a connecting cover portion extending between the base region cover portion and the leg region cover portion, the connecting cover portion including an outer base surface coupling the outer portion of the base region cover portion with the outer portion of the leg region cover portion, a first side surface coupling the first side portion of the base region cover portion with the first side portion of the leg region cover portion, a second side surface coupling the second side portion of the base region cover portion with the second side portion of the leg region cover portion, and a plurality of nub bumper members extending outwardly from the outer base surface, the cover portion spacing apart the inward edge of the base region cover portion from the inward edge of the leg region cover portion, so as to define an opening of sufficient size so as to insert the base therethrough to position the base region cover portion thereover, and to insert the leg region therethrough to position the leg region cover portion thereover, and upon installation, wherein the bend region is visible through the opening defined by the inward edge of the base region cover portion and the inward edge of the leg region cover portion.

2. The protective hook cover of claim 1 wherein the plurality of nub bumper member comprise a first end nub member positioned proximate the first side surface of the connecting cover portion and a second end nub member positioned proximate the second side surface of the connecting cover portion, and at least one central nub member positioned therebetween.

3. The protective hook cover of claim 2 wherein the first end nub member includes a first surface which is inclined outwardly toward the fist side surface from an outer surface of the first end nub toward the outer base surface, and the second end nub member includes a fist surface which is inclined outwardly toward the second side surface from an outer surface of the second end nub toward the outer base surface.

4. The protective hook cover of claim 3 wherein the at least one central nub member comprises a plurality of central nub members spaced apart from each other extending from the outer base surface and extending between the first end nub member and the second nub member.

5. The protective hook cover of claim 4 wherein each of the central nub members are substantially identical and each include a first side and a second side with an outer surface spanning therebetween, the first and second sides being substantially parallel to each other.

6. The protective hook cover of claim 5 wherein each of the central nub members are substantially parallel to each other.

7. The protective hook cover of claim 5 wherein the plurality of nub members comprise one of the group selected by cylindrical nub members, cylindrical nub members with a concave upper surface, hemispherical nub members, and nub members that extend from side to side along the base outer surface.

8. The protective hook cover of claim 3 wherein the first and second nub bumper members and the at least one central nub member each have a substantially semicircular outer surface corresponding to a bend region of the hook member.

9. The protective hook cover of claim 1 wherein the base region cover portion and the leg region cover portion are angled relative to each other when in an unstressed orientation.

10. The protective hook cover of claim 9 wherein the base region cover portion and the leg region cover portion are angled relative to each other at an angle that is greater than an angle between a base and a leg of a hook member, such that the shape of the protective hook cover in an installed orientation is different than the shape of the protective hook cover in an unstressed orientation.

11. The protective hook cover of claim 9 wherein the outer surface of the nub bumper members are stretched when in an installed orientation.

12. The protective hook cover of claim 1 wherein the inward edge of the inner portion of the base region cover portion and the inward edge of the inner portion of the leg region cover portion are on opposing sides of a retention channel in the installed orientation.

13. The protective hook cover of claim 12 wherein the polymer material comprises a: thermoplastic elastomer.

14. A combination hook member and protective hook cover wherein:
the hook member further comprises:
a base and a leg joined together about a bend region so as to define a retention channel therebetween,
the protective hook cover slidably overlayingly positioned over the hook member and further comprises comprising:
a base region cover portion extendable over the base of the hook member, the base region cover portion including an outer portion and an inner portion, a first side portion and a second side portion opposite the first side portion, the outer portion, inner portion, first and second side portions defining an outward opening at an end thereof, and the inner portion defining an inward edge;
a leg region cover portion extendable over the leg of a hook member, the leg region cover portion including an outer portion, an inner portion, a cap portion, a first side portion and a second side portion, the cap portion covering a second end edge of the leg of the hook member, with the outer portion, the inner portion, the cap portion, the first and second side portions defining a cavity for receipt of at least a portion of a leg of a hook member, the inner portion defining an inward edge; and
a connecting cover portion extending between the base region cover portion and the leg region cover portion, the connecting cover portion including an outer base surface coupling the outer portion of the base region cover portion with the outer portion of the leg region cover portion, a first side surface coupling the first side portion of the base region cover portion with the first side portion of the leg region cover portion, a second side surface coupling the second side portion of the base region cover portion with the second side portion of the leg region cover portion, and a plurality of nub bumper members extending outwardly from the outer base surface,
wherein, the cover portion spacing apart the inward edge of the base region cover portion from the inward edge of the leg region cover portion, so as to define an opening of sufficient size so as to insert the base therethrough to position the base region cover portion thereover, and to insert the leg region therethrough to position the leg region cover portion thereover, and upon installation, wherein the bend region is visible through the opening defined by the inward edge of the base region cover portion and the inward edge of the leg region cover portion.

15. The protective hook cover of claim 14 wherein the base region cover portion and the leg region cover portion are angled relative to each other when in an unstressed orientation.

16. The protective hook cover of claim 15 wherein the base region cover portion and the leg region cover portion are angled relative to each other at an angle that is greater than an angle between a base and a leg of a hook member, such that the shape of the protective hook cover in an installed orientation is different than the shape of the protective hook cover in an unstressed orientation.

17. The protective hook cover of claim 14 wherein the outer surface of the nub bumper members are stretched when in an installed orientation.

18. The protective hook cover of claim 14 wherein the inward edge of the inner portion of the base region cover portion and the inward edge of the inner portion of the leg region cover portion are on opposing sides of a retention channel in the installed orientation.

* * * * *